(12) United States Patent
Tokai

(10) Patent No.: US 8,797,007 B2
(45) Date of Patent: Aug. 5, 2014

(54) SEMICONDUCTOR INTEGRATED CIRCUIT AND DC-DC CONVERTER

(75) Inventor: Yoichi Tokai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 213 days.

(21) Appl. No.: 13/419,577

(22) Filed: Mar. 14, 2012

(65) Prior Publication Data

US 2013/0141060 A1    Jun. 6, 2013

(30) Foreign Application Priority Data

Dec. 1, 2011    (JP) .................................. 2011-263663

(51) Int. Cl.
*G05F 1/00*    (2006.01)

(52) U.S. Cl.
USPC ........................................................ 323/271

(58) Field of Classification Search
USPC ......... 323/222, 223, 224, 265, 271, 282, 283, 323/284, 285
See application file for complete search history.

(56) References Cited

U.S. PATENT DOCUMENTS

| 6,127,746 A | 10/2000 | Clemente |
| 6,414,403 B2 * | 7/2002 | Kitagawa et al. ............... 307/66 |
| 7,330,065 B2 | 2/2008 | Simonson |

FOREIGN PATENT DOCUMENTS

| GB | 2 318 467 A | 4/1998 |
| JP | 10-173500 | 6/1998 |

* cited by examiner

*Primary Examiner* — Matthew Nguyen
*Assistant Examiner* — Afework Demisse
(74) *Attorney, Agent, or Firm* — Oblon, Spivak, McClelland, Maier & Neustadt, L.L.P.

(57) ABSTRACT

A DC-DC converter includes a smoothing capacitor connected between a first output terminal connected to a first end of a load and a second output terminal connected to a second end of the load, the smoothing capacitor smoothing an output voltage. The DC-DC converter includes a choke coil having a first end connected to a first end of a battery. The DC-DC converter includes a semiconductor integrated circuit having a switch terminal connected to a second end of the choke coil, a first potential terminal connected to the first output terminal, and a second potential terminal connected to the second output terminal and a second end of the battery.

19 Claims, 2 Drawing Sheets

SEMICONDUCTOR INTEGRATED CIRCUIT AND DC-DC CONVERTER

CROSS-REFERENCE TO RELATED APPLICATION

This application is based upon and claims the benefit of priority from the prior Japanese Patent Application No. 2011-263663, filed on Dec. 1, 2011, the entire contents of which are incorporated herein by reference.

BACKGROUND

1. Field

Embodiments described herein relate generally to a semiconductor integrated circuit and a DC-DC converter.

2. Background Art

Conventionally, a DC-DC converter turns on/off multiple switch elements or rectifier elements to control the on/off time ratio of a switching pulse, thereby supplying a desired voltage and a desired current to a load.

For size reduction and high-speed control of such a DC-DC converter, improvements have been made to obtain higher switching frequencies. However, in the case where an on/off speed for higher efficiency is increased more than necessary, electro magnetic interference (EMI) or ground noise may occur.

DETAILED DESCRIPTION

Figure 1:
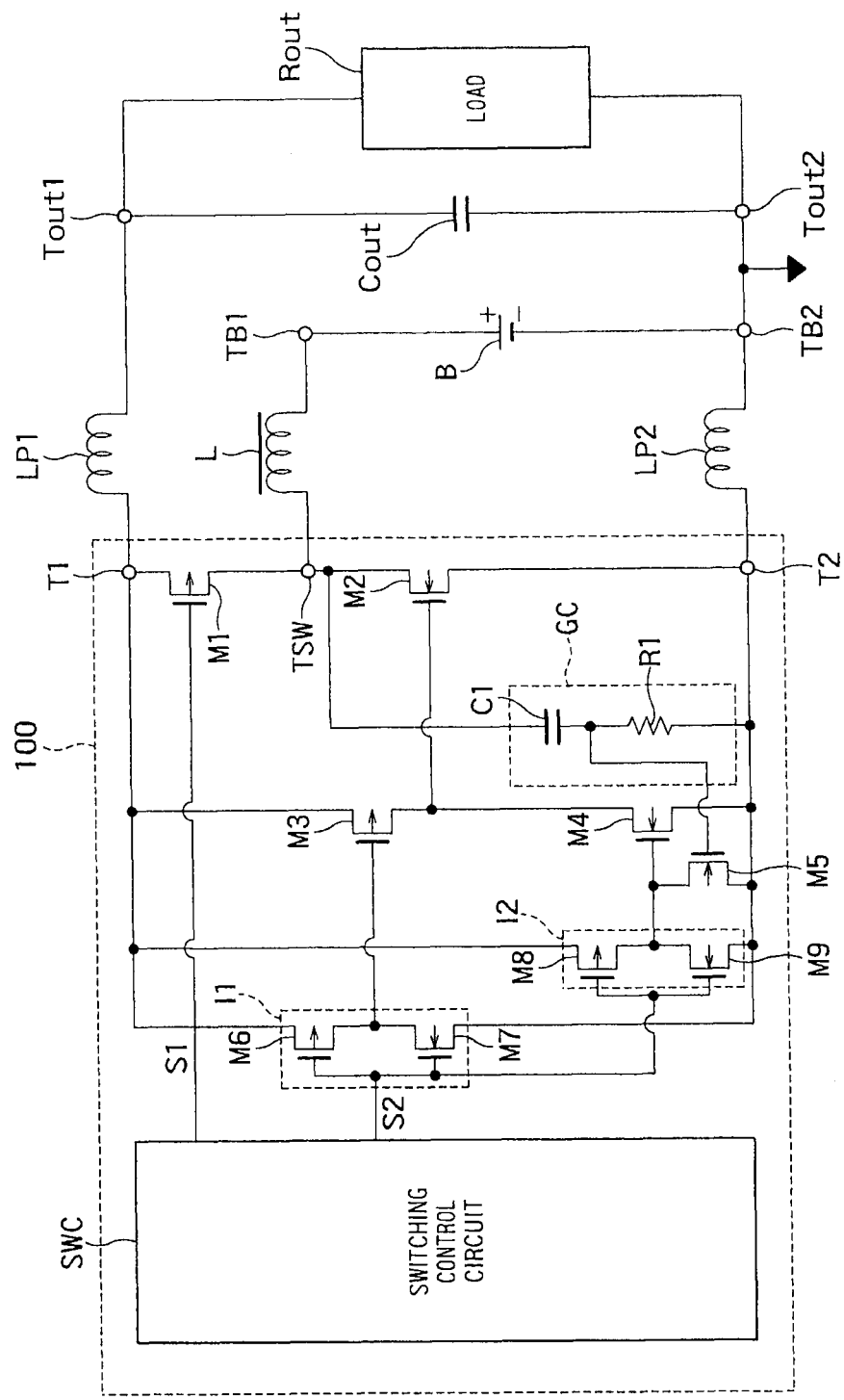
FIG. 1 is a diagram showing an example of the configuration of a DC-DC converter 1000 according to a first embodiment.

A DC-DC converter according to an embodiment includes a smoothing capacitor connected between a first output terminal connected to a first end of a load and a second output terminal connected to a second end of the load, the smoothing capacitor smoothing an output voltage. The DC-DC converter includes a choke coil having a first end connected to a first end of a battery. The DC-DC converter includes a semiconductor integrated circuit having a switch terminal connected to a second end of the choke coil, a first potential terminal connected to the first output terminal, and a second potential terminal connected to the second output terminal and a second end of the battery.

The semiconductor integrated circuit includes a first MOS transistor of a first conductivity type, the first MOS transistor having a first end connected to the first potential terminal, a second end connected to the switch terminal, and a gate fed with a first control signal. The semiconductor integrated circuit includes a second MOS transistor of a second conductivity type, the second MOS transistor having a first end connected to the switch terminal and a second end connected to the second potential terminal. The semiconductor integrated circuit includes a third MOS transistor of the first conductivity type, the third MOS transistor having a first end connected to the first potential terminal and a second end connected to a gate of the second MOS transistor. The semiconductor integrated circuit includes a fourth MOS transistor of the second conductivity type, the fourth MOS transistor having a first end connected to the second end of the third MOS transistor and a second end connected to the second potential terminal. The semiconductor integrated circuit includes a fifth MOS transistor of the second conductivity type, the fifth MOS transistor having a first end connected to a gate of the fourth MOS transistor and a second end connected to the second potential terminal. The semiconductor integrated circuit includes a first inverter that is fed with a second control signal and has an output connected to the gate of the third MOS transistor. The semiconductor integrated circuit includes a second inverter that is fed with the second control signal and has an output connected to the gate of the fourth MOS transistor. The semiconductor integrated circuit includes a switching control circuit that controls operations of the first MOS transistor and the second MOS transistor by means of the first control signal and the second control signal. The semiconductor integrated circuit includes a gate control circuit that is connected between the switch terminal and the second potential terminal to control an operation of the fifth MOS transistor.

Hereafter, a semiconductor integrated circuit and a DC-DC converter according to the present invention will be described more specifically with reference to the drawings.

Embodiments will be described below with reference to the accompanying drawings.

First Embodiment

FIG. 1 illustrates an example of the configuration of a DC-DC converter 1000 according to a first embodiment.

As illustrated in FIG. 1, the DC-DC converter 1000 includes a semiconductor integrated circuit 100, a choke coil L, and a smoothing capacitor Cout.

The smoothing capacitor Cout is connected between a first output terminal Tout1 connected to one end of a load Rout and a second output terminal Tout2 connected to the other end of the load Rout. The smoothing capacitor Cout smoothes an output voltage supplied to the load Rout.

The choke coil L has one end connected to one end (positive electrode) TB1 of a battery B and the other end connected to a switch terminal TSW.

The semiconductor integrated circuit 100 includes the switch terminal TSW, a first potential terminal T1, a second potential terminal T2, a first MOS transistor (pMOS transistor) M1 of a first conductivity type, a second MOS transistor (nMOS transistor) M2 of a second conductivity type, a third MOS transistor (pMOS transistor) M3 of the first conductivity type, a fourth MOS transistor (nMOS transistor) M4 of the second conductivity type, a fifth MOS transistor (nMOS transistor) M5 of the second conductivity type, a first inverter I1, a second inverter I2, a switching control circuit SWC, and a gate control circuit GC.

The switch terminal TSW is connected to the other end of the choke coil L.

The first potential terminal T1 is connected to the first output terminal Tout1.

Moreover, a first parasitic inductor is provided on wiring between the first output terminal Tout1 and the first potential terminal T1.

The second potential terminal T2 is connected to the second output terminal Tout2 and an opposite end (negative electrode) TB2 of the battery B.

Furthermore, a second parasitic inductor is provided on wiring between the second output terminal Tout2 and the second potential terminal T2.

The first MOS transistor M1 has one end (source) connected to the first potential terminal T1 and the other end (drain) connected to the switch terminal TSW. A first control signal S1 is inputted to the gate of the first MOS transistor M1.

The second MOS transistor M2 has one end (drain) connected to the switch terminal TSW and the other end (source) connected to the second potential terminal T2.

The third MOS transistor M3 has one end (source) connected to the first potential terminal T1 and the other end (drain) connected to the gate of the second MOS transistor M2.

The fourth MOS transistor M4 has one end (drain) connected to the other end (drain) of the third MOS transistor M3 and the other end (source) connected to the second potential terminal T2.

The fifth MOS transistor M5 has one end (drain) connected to the gate of the fourth MOS transistor M4 and the other end (source) connected to the second potential terminal T2.

The first inverter I1 is fed with a second control signal S2 and has an output connected to the gate of the third MOS transistor M3.

As illustrated in FIG. 1, the first inverter I1 includes, for example, a sixth MOS transistor (pMOS transistor) M6 of the first conductivity type and a seventh MOS transistor (nMOS transistor) M7 of the second conductivity type.

The sixth MOS transistor M6 has one end (source) connected to the first potential terminal T1 and the other end (drain) connected to the gate of the third MOS transistor M3. The second control signal S2 is inputted to the gate of the sixth MOS transistor M6.

The seventh MOS transistor M7 has one end (drain) connected to the other end (drain) of the sixth MOS transistor M6, the other end (source) connected to the second potential terminal T2, and a gate connected to the gate of the sixth MOS transistor M6.

The second inverter I2 is fed with the second control signal S2 and has an output connected to the gate of the fourth MOS transistor M4.

As illustrated in FIG. 1, the second inverter I2 includes, for example, an eighth MOS transistor (pMOS transistor) M8 of the first conductivity type and a ninth MOS transistor (nMOS transistor) M9 of the second conductivity type.

The eighth MOS transistor M8 has one end (source) connected to the first potential terminal T1, the other end (drain) connected to the gate of the fourth MOS transistor M4, and a gate connected to the gate of the sixth MOS transistor M6.

The ninth MOS transistor M9 has one end (drain) connected to the other end (drain) of the eighth MOS transistor M8, the other end (source) connected to the second potential terminal T2, and a gate connected to the gate of the eighth MOS transistor M8.

The switching control circuit SWC controls the operations of the first MOS transistor M1 and the second MOS transistor M2 by means of the first control signal S1 and the second control signal S2.

For example, the switching control circuit SWC controls the first MOS transistor M1 and the second MOS transistor M2 so as to complementarily turn on/off the MOS transistors by means of the first control signal S1 and the second control signal S2.

In this case, for example, the switching control circuit SWC turns off the second MOS transistor M2 and then turns on the first MOS transistor M1 to prevent passage of a through-current between the first MOS transistor M1 and the second MOS transistor M2.

The gate control circuit GC is connected between the switch terminal TSW and the second potential terminal T2 to control the operation of the fifth MOS transistor M5.

The gate control circuit GC turns on the fifth MOS transistor M5 in the case where the second MOS transistor M2 is controlled to limit a reduction rate of current passing through the second MOS transistor M2.

For example, the gate control circuit GC includes a first capacitor C1 and a first resistance element R1.

The first capacitor C1 has one end connected to the switch terminal TSW and the other end connected to the gate of the fifth MOS transistor M5.

The first resistance element R1 is connected between the other end of the first capacitor C1 and the second potential terminal T2.

Figure 2:
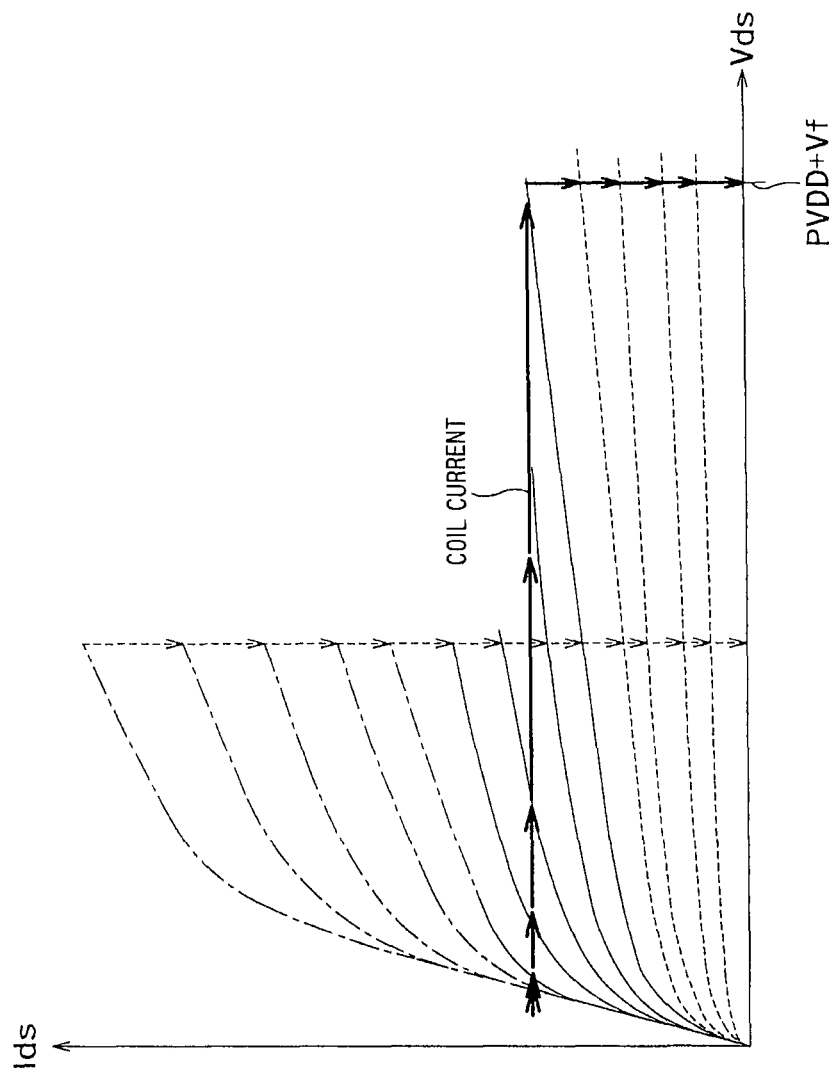
FIG. 2 is a diagram showing a static characteristics of the second MOS transistor M2 illustrated in FIG. 1.

The following will describe an example of the operations of the DC-DC converter 1000 configured thus. In this explanation, after the first MOS transistor M1 is turned off and the second MOS transistor M2 is turned on, the first MOS transistor M1 is turned on and the second MOS transistor M2 is turned off. FIG. 2 shows the static characteristics of the second MOS transistor M2 illustrated in FIG. 1. In FIG. 2, PVDD represents a source voltage of the first MOS transistor M1 and Vf represents a voltage drop caused by the parasitic diode of the first MOS transistor M1.

First, the first MOS transistor M1 is turned off and the second MOS transistor M2 is turned on. In this state, the first control signal S1 is at "High" level and the second control signal S2 is at "High" level.

Then, the switching control circuit SWC sets the second control signal S2 at "Low" level. Thus, a gate signal at "Low" level is applied to the gate of the second MOS transistor M2, which turns off the second MOS transistor M2 to limit a current passing through the second MOS transistor M2.

At this point, in the case where the gate voltage of the second MOS transistor M2 falls from "High" level to a pinch-off voltage when Ids is equal to a coil current, the coil current exceeds the path of the second MOS transistor M2 and an excessive coil current raises the potential of the switch terminal TSW, so that the voltage of the switch terminal TSW is inverted from "Low" level to "High" level. After the voltage of the switch terminal TSW reaches "High" level, the excessive current flows to T1 through the body diode of the first MOS transistor M1. When the gate voltage of the second MOS transistor M2 falls and the second MOS transistor M2 is turned off, the drain current of the second MOS transistor M2 further decreases to 0; meanwhile, a current passing through the first MOS transistor M1, in particular, the body diode of the transistor increases to the coil current.

When a current for generating an electromotive force in a second parasitic inductor LP2 decreases, the absolute value of a slew rate dI/dt can be increased by a slew rate dV/dt of the gate voltage of the second MOS transistor M2 after voltage reversal.

Immediately after the reversal, the gate control circuit GC supplies a voltage proportionate to $e^{(-t/(CR))}$ to the gate of the fifth MOS transistor M5. In other words, in the case where the second MOS transistor M2 is controlled so as to limit a current passing through the second MOS transistor M2, the gate control circuit GC turns on the fifth MOS transistor M5.

Thus, a current supplied from the second inverter I2 to the gate of the fourth MOS transistor M4 is drawn to ground by the fifth MOS transistor M5. Consequently, a time for switching on the fourth MOS transistor M4 increases and the drawing rate of the gate charge of the second MOS transistor M2 decreases. Hence, the slew rate dI/dt and the electromotive force are reduced (FIG. 2), which suppresses ground noise.

After that, the switching control circuit SWC sets the first control signal S1 at "High" level and the second control signal S2 at "Low" level to prevent passage of a through-current, so that the first MOS transistor M1 is turned off and the second MOS transistor M2 is turned off.

Then, the switching control circuit SWC sets the first control signal S1 at "Low" level and the second control signal S2 at "Low" level, so that the first MOS transistor M1 is turned on and the second MOS transistor M2 is turned off.

These operations allow completion of switching from a state in which the first MOS transistor M1 is turned off and the second MOS transistor M2 is turned on to a state in which the first MOS transistor M1 is turned on and the second MOS transistor M2 is turned off.

As described above, the operations of the DC-DC converter 1000 reduce a speed for turning off the second MOS transistor M2 even when a switching speed rises. Thus, the slew rate dI/dt and the electromotive force generated by the parasitic inductor are reduced, which suppresses ground noise.

In other words, the DC-DC converter 1000 according to the present embodiment can reduce ground noise while increasing the switching speed.

In the present embodiment, the coil L is connected to the positive electrode of the battery, the smoothing capacitor Cout is connected between the first output terminal Tout1 connected to one end of the load Rout and the second output terminal Tout2 connected to the other end of the load Rout, the MOS transistor of the first conductivity type is a pMOS transistor, and the MOS transistor of the second conductivity type is an nMOS transistor.

The current polarity of the circuit may be reversed, that is, the positive electrode (first output terminal Tout1) of the smoothing capacitor Cout and one end of the load Rout may be connected to the coil L, the MOS transistor of the first conductivity type may be an nMOS transistor having a source connected to the negative electrode of the battery, and the MOS transistor of the second conductivity type may be a pMOS transistor having a source connected to the positive electrode of the battery.

The DC-DC converter according to the present embodiment is also applicable to a (an inverting) buck-boost converter and a non-inverting buck-boost converter.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A DC-DC converter comprising:
a smoothing capacitor connected between a first output terminal connected to a first end of a load and a second output terminal connected to a second end of the load, the smoothing capacitor smoothing an output voltage;
a choke coil having a first end connected to a first end of a battery; and
a semiconductor integrated circuit having a switch terminal connected to a second end of the choke coil, a first potential terminal connected to the first output terminal, and a second potential terminal connected to the second output terminal and a second end of the battery,
the semiconductor integrated circuit comprising:
a first MOS transistor of a first conductivity type, the first MOS transistor having a first end connected to the first potential terminal, a second end connected to the switch terminal, and a gate fed with a first control signal;
a second MOS transistor of a second conductivity type, the second MOS transistor having a first end connected to the switch terminal and a second end connected to the second potential terminal;
a third MOS transistor of the first conductivity type, the third MOS transistor having a first end connected to the first potential terminal and a second end connected to a gate of the second MOS transistor;
a fourth MOS transistor of the second conductivity type, the fourth MOS transistor having a first end connected to the second end of the third MOS transistor and a second end connected to the second potential terminal;
a fifth MOS transistor of the second conductivity type, the fifth MOS transistor having a first end connected to a gate of the fourth MOS transistor and a second end connected to the second potential terminal;
a first inverter that is fed with a second control signal and has an output connected to the gate of the third MOS transistor;
a second inverter that is fed with the second control signal and has an output connected to the gate of the fourth MOS transistor;
a switching control circuit that controls operations of the first MOS transistor and the second MOS transistor by means of the first control signal and the second control signal; and
a gate control circuit that is connected between the switch terminal and the second potential terminal to control an operation of the fifth MOS transistor.

2. The DC-DC converter according to claim 1, wherein the gate control circuit turns on the fifth MOS transistor in the case where the second MOS transistor is controlled so as to limit a reduction rate of current passing through the second MOS transistor.

3. The DC-DC converter according to claim 1, wherein
the gate control circuit comprises
a first capacitor that has a first end connected to the switch terminal and a second end connected to the gate of the fifth MOS transistor; and
a first resistance element that is connected between the second end of the first capacitor and the second potential terminal.

4. The DC-DC converter according to claim 2, wherein
the gate control circuit comprises
a first capacitor that has a first end connected to the switch terminal and a second end connected to the gate of the fifth MOS transistor; and
a first resistance element that is connected between the second end of the first capacitor and the second potential terminal.

5. The DC-DC converter according to claim 1, wherein the switching control circuit controls the first MOS transistor and the second MOS transistor so as to complementarily turn on/off the MOS transistors by means of the first control signal and the second control signal.

6. The DC-DC converter according to claim 5, wherein the switching control circuit turns off the second MOS transistor and then turns on the first MOS transistor to prevent passage of a through-current between the first MOS transistor and the second MOS transistor.

7. The DC-DC converter according to claim 1, wherein
a first parasitic inductor is provided on wiring between the first output terminal and the first potential terminal, and
a second parasitic inductor is provided on wiring between the second output terminal and the second potential terminal.

8. The DC-DC converter according to claim 1, wherein the first inverter includes:
- a sixth MOS transistor of the first conductivity type, the sixth MOS transistor having a first end connected to the first potential terminal, a second end connected to the gate of the third MOS transistor, and a gate fed with the second control signal; and
- a seventh MOS transistor of the second conductivity type, the seventh MOS transistor having a first end connected to the second end of the sixth MOS transistor, a second end connected to the second potential terminal, and a gate connected to the gate of the sixth MOS transistor, and the second inverter includes:
- an eighth MOS transistor of the first conductivity type, the eighth MOS transistor having a first end connected to the first potential terminal, a second end connected to the gate of the fourth MOS transistor, and a gate connected to the gate of the sixth MOS transistor; and
- a ninth MOS transistor of the second conductivity type, the ninth MOS transistor having a first end connected to the second end of the eighth MOS transistor, a second end connected to the second potential terminal, and a gate connected to the gate of the eighth MOS transistor.

9. The DC-DC converter according to claim 2, wherein the first inverter includes:
- a sixth MOS transistor of the first conductivity type, the sixth MOS transistor having a first end connected to the first potential terminal, a second end connected to the gate of the third MOS transistor, and a gate fed with the second control signal; and
- a seventh MOS transistor of the second conductivity type, the seventh MOS transistor having a first end connected to the second end of the sixth MOS transistor, a second end connected to the second potential terminal, and a gate connected to the gate of the sixth MOS transistor, and the second inverter includes:
- an eighth MOS transistor of the first conductivity type, the eighth MOS transistor having a first end connected to the first potential terminal, a second end connected to the gate of the fourth MOS transistor, and a gate connected to the gate of the sixth MOS transistor; and
- a ninth MOS transistor of the second conductivity type, the ninth MOS transistor having a first end connected to the second end of the eighth MOS transistor, a second end connected to the second potential terminal, and a gate connected to the gate of the eighth MOS transistor.

10. The DC-DC converter according to claim 1, wherein
the first end of the battery is a positive electrode,
the second end of the battery is a negative electrode,
the first and third MOS transistors are pMOS transistors, and
the second and fourth MOS transistors are nMOS transistors.

11. A semiconductor integrated circuit applied to a DC-DC converter, the DC-DC converter comprising: a smoothing capacitor that is connected between a first output terminal connected to a first end of a load and a second output terminal connected to a second end of the load, the smoothing capacitor smoothing an output voltage; and a choke coil having a first end connected to a first end of a battery, the semiconductor integrated circuit comprising:
- a switch terminal connected to a second end of the choke coil;
- a first potential terminal connected to the first output terminal;
- a second potential terminal connected to the second output terminal and a second end of the battery;
- a first MOS transistor of a first conductivity type, the first MOS transistor having a first end connected to the first potential terminal, a second end connected to the switch terminal, and a gate fed with a first control signal;
- a second MOS transistor of a second conductivity type, the second MOS transistor having a first end connected to the switch terminal and a second end connected to the second potential terminal;
- a third MOS transistor of the first conductivity type, the third MOS transistor having a first end connected to the first potential terminal and a second end connected to a gate of the second MOS transistor;
- a fourth MOS transistor of the second conductivity type, the fourth MOS transistor having a first end connected to the second end of the third MOS transistor and a second end connected to the second potential terminal;
- a fifth MOS transistor of the second conductivity type, the fifth MOS transistor having a first end connected to a gate of the fourth MOS transistor and a second end connected to the second potential terminal;
- a first inverter that is fed with a second control signal and has an output connected to the gate of the third MOS transistor;
- a second inverter that is fed with the second control signal and has an output connected to the gate of the fourth MOS transistor;
- a switching control circuit that controls operations of the first MOS transistor and the second MOS transistor by means of the first control signal and the second control signal; and
- a gate control circuit that is connected between the switch terminal and the second potential terminal to control an operation of the fifth MOS transistor.

12. The semiconductor integrated circuit according to claim 11, wherein the gate control circuit turns on the fifth MOS transistor in the case where the second MOS transistor is controlled so as to limit a reduction rate of current passing through the second MOS transistor.

13. The semiconductor integrated circuit according to claim 11, wherein
the gate control circuit comprises
- a first capacitor that has a first end connected to the switch terminal and a second end connected to the gate of the fifth MOS transistor; and
- a first resistance element that is connected between the second end of the first capacitor and the second potential terminal.

14. The semiconductor integrated circuit according to claim 12, wherein
the gate control circuit comprises
- a first capacitor that has a first end connected to the switch terminal and a second end connected to the gate of the fifth MOS transistor; and
- a first resistance element that is connected between the second end of the first capacitor and the second potential terminal.

15. The semiconductor integrated circuit according to claim 11, wherein the switching control circuit controls the first MOS transistor and the second MOS transistor so as to complementarily turn on/off the MOS transistors by means of the first control signal and the second control signal.

16. The semiconductor integrated circuit according to claim 15, wherein the switching control circuit turns off the second MOS transistor and then turns on the first MOS transistor to prevent passage of a through-current between the first MOS transistor and the second MOS transistor.

17. The semiconductor integrated circuit according to claim 11, wherein
a first parasitic inductor is provided on wiring between the first output terminal and the first potential terminal, and
a second parasitic inductor is provided on wiring between the second output terminal and the second potential terminal.

18. The semiconductor integrated circuit according to claim 11, wherein the first inverter includes:
a sixth MOS transistor of the first conductivity type, the sixth MOS transistor having a first end connected to the first potential terminal, a second end connected to the gate of the third MOS transistor, and a gate fed with the second control signal; and
a seventh MOS transistor of the second conductivity type, the seventh MOS transistor having a first end connected to the second end of the sixth MOS transistor, a second end connected to the second potential terminal, and a gate connected to the gate of the sixth MOS transistor, and the second inverter includes:
an eighth MOS transistor of the first conductivity type, the eighth MOS transistor having a first end connected to the first potential terminal, a second end connected to the gate of the fourth MOS transistor, and a gate connected to the gate of the sixth MOS transistor; and
a ninth MOS transistor of the second conductivity type, the ninth MOS transistor having a first end connected to the second end of the eighth MOS transistor, a second end connected to the second potential terminal, and a gate connected to the gate of the eighth MOS transistor.

19. The semiconductor integrated circuit according to claim 11, wherein
the first end of the battery is a positive electrode,
the second end of the battery is a negative electrode,
the first and third MOS transistors are pMOS transistors, and
the second and fourth MOS transistors are nMOS transistors.

* * * * *